(12) United States Patent
Khurgin et al.

(10) Patent No.: US 7,693,428 B2
(45) Date of Patent: Apr. 6, 2010

(54) OPTICAL ORTHOGONAL FREQUENCY DIVISION MULTIPLEXED COMMUNICATIONS WITH NONLINEARITY COMPENSATION

(75) Inventors: Jacob Khurgin, Baltimore, MD (US); Isaac Shpantzer, Bethesda, MD (US)

(73) Assignee: CeLight, Inc., Silver Spring, MD (US)

( * ) Notice: Subject to any disclaimer, the term of this patent is extended or adjusted under 35 U.S.C. 154(b) by 0 days.

(21) Appl. No.: 12/418,060

(22) Filed: Apr. 3, 2009

(65) Prior Publication Data
US 2009/0190929 A1    Jul. 30, 2009

Related U.S. Application Data

(63) Continuation-in-part of application No. 12/045,765, filed on Mar. 11, 2008, and a continuation-in-part of application No. 11/695,920, filed on Apr. 3, 2007, and a continuation-in-part of application No. 11/679,376, filed on Feb. 27, 2007.

(60) Provisional application No. 61/045,783, filed on Apr. 17, 2008.

(51) Int. Cl.
H04B 10/04    (2006.01)
H04B 10/06    (2006.01)

(52) U.S. Cl. ............... 398/192; 398/183; 398/185; 398/187; 398/202

(58) Field of Classification Search ............ 398/183, 398/185, 187, 192, 202
See application file for complete search history.

(56) References Cited

U.S. PATENT DOCUMENTS

| 7,023,601 B2* | 4/2006 | McGhan et al. | 359/246 |
| 7,321,734 B2* | 1/2008 | Roberts et al. | 398/193 |
| 7,529,490 B2* | 5/2009 | Hoshida | 398/207 |

* cited by examiner

*Primary Examiner*—Dalzid Singh
(74) *Attorney, Agent, or Firm*—Nadya Reingand

(57) ABSTRACT

The present invention discloses a transmitter and receiver for optical communications system, which provide compensation of the optical link nonlinearity. M-PSK modulating is used for data embedding in an optical signal in each WDM channel using orthogonal frequency division multiplexing (OFDM) technique. At the receiver side electrical output signals from a coherent optical receiver are processed digitally with the link nonlinearity compensation. It is followed by the signal conversion into frequency domain and information recovery from each subcarrier of the OFDM signal. At the transmitter side an OFDM encoder provides a correction of I and Q components of a M-PSK modulator driving signal to compensate the link nonlinearity prior to sending the optical signal to the receiver.

20 Claims, 6 Drawing Sheets

(a)

(b)

OPTICAL ORTHOGONAL FREQUENCY DIVISION MULTIPLEXED COMMUNICATIONS WITH NONLINEARITY COMPENSATION

CROSS-REFERENCE TO RELATED APPLICATIONS

This application claims priority to U.S. provisional application 61/045,783 filed Apr. 17, 2008, and this application is a continuation-in-part of U.S. patent application Ser. No. 12/045,765 filed Mar. 11, 2008, Ser. No. 11/679,376 filed Feb. 27, 2007 and Ser. No. 11/695,920 filed Apr. 3, 2007, all of which applications are fully incorporated herein by reference.

FIELD OF INVENTION

This invention relates generally to optical communications systems and methods that utilize coherent detection technique, WDM M-PSK transmission and optical orthogonal frequency division multiplexing (OFDM). In particular the present invention addresses a method and system for digital compensation of nonlinearity in optical signals received via optical communication link. The invention discloses communication typically up to 100 Gb/s transmission rate that can be implemented for various information exchange structures including data transmission and video broadcasting.

BACKGROUND OF THE INVENTION

Orthogonal frequency division multiplexing is widely used technique of transmission in the RF domain where it allows mitigating signal fading in multi-path propagation. The present invention discloses the use of orthogonal frequency division multiplexing in optical links and, in particular, in fiber communications.

In optical OFDM systems each WDM channel the optical carrier is directly modulated by a complex RF signal that can be construed as a linear combination of M separate digitally modulated RF signals at frequencies $f_m$ such that $f_m = m/T$ h power where T is the period of modulation. Thus the total symbol rate of the transmitted information is M/T. In the text we shall refer to the frequencies $f_m$ as "subcarriers".

In modern optical communication systems, a coherent detection technique is implemented, which provides improved sensitivity compared with traditional direct detection schemes. Typically coherent detection is used with phase-shift-keying (PSK) data transmission. The present invention is also focused on M-PSK, and in the preferred embodiment, QPSK (quadrature PSK) data transmission. However this does not limit the scope of the invention, and various types of data modulation can benefit from the disclosed invention.

In a coherent receiver, the QPSK incoming optical signal is mixed with a strong local oscillators to produce in-phase (I) and in-quadrature (Q) outputs. I and Q components of the output optical signal are converted into electrical signals by a set of photodetectors. In the preferred configuration four balanced photodetectors are used to recover QPSK encoded data.

Data transmission multiplexing light of two orthogonal polarizations via the same optical channel allows doubling the data rate. At the receiver side, the orthogonal polarizations are split by a polarization beam splitter, and the light of each orthogonal polarization is detected separately.

U.S. patent application Ser. No. 10/405,236 by Roberts et al. discloses a nonlinearity compensation system applicable to WDM optical transmission. It considers many WDM channels and essentially performs numerically operations of complex amplitudes of the signals in all channels. However it is completely impractical to assure perfect control of the relative optical phase shifts between different WDM channels as they travel through their respective fibers (shown as 10a in FIG. 2 of '236) and through the MUX. The latency of the system is quite long, it includes travel time through the link, plus processing, which is typically a few milliseconds. Over that time the relative phases of different channels significantly shift. Such system requires the adjustment of their parameters at a rate of GHz. Alternatively such system may be used with a look-up table (LUT). The calculations show that the size of such LUT and the power consumptions make this solution impractical. Furthermore, since the whole link is dispersive in the system described in '236, the disclosed compensation does not provide sufficient link performance.

High capacity optical signal transmission is affected by the channel nonlinearity and dispersion, which leads to the limitations in the channel capacity, transmission distance and error rates. The present invention addresses this problem of the signal distortion caused by nonlinear effects.

SUMMARY OF THE INVENTION

The present invention provides a system and method for optical communications with a high throughput. The system and method are disclosed for optical transmission with M-PSK modulating of an optical signal in each WDM channel using orthogonal frequency division multiplexing (OFDM) technique. The improved performance is achieved by the link non-linearity compensation at the transmitter and/or at the receiver side.

Each subcarrier of OFD-multiplexed channel of WDM communication system is individually QPSK encoded with data. The data modulated beam is transmitted towards receiver, which comprises at least one optical hybrid and a set of photodetectors outputting electrical signals I and Q. A digital signal processing (DSP) unit receives the electrical signals I and Q, converts them into digital signal and multiplies by a parameter compensating the link nonlinearity. Then the signals I and Q are transformed in frequency domain forming a set of spectral signals each having its own digital frequency. The data encoded in each spectral signal is demodulated, and the received information is displayed or used for further processing.

In the preferred embodiment the DSP unit compensates nonlinearity of the second half-length of the optical link; however it may compensate the whole link or any portion of it.

In the preferred embodiment the optical hybrid is a 90-degrees optical hybrid, an integrated device made of an electro-optical material or thermo-optical material or a combination of thereof.

In the preferred embodiment the transmitter also performs nonlinearity compensation procedure. It operates in the following manner: a digital data stream enters an orthogonal frequency division multiplexed (OFDM) encoder, the encoder outputs I and Q analog signals driving an optical modulator. The modulator modulates separately each OFDM subcarrier of each WDM channel of an initial optical beam from a light source. The modulator outputs a M-PSP modulated optical beam that is transmitted in the optical link, and the OFDM encoder performs a compensation of the optical link nonlinearity by multiplying each subcarrier on a compensation coefficient.

In the preferred embodiment the DSP unit compensates nonlinearity of the first half-length of the optical link; however it may compensate the whole link or any portion of it.

An optical system for data transmission using the described above transmitter and receiver with a transmission rate up to 100 Gb/s. The system may be adapted to operate with light having two polarization components.

DETAILED DESCRIPTION OF THE PREFERRED EMBODIMENT

This disclosure describes a number of embodiments of one or more optical transmission systems and elements. Within this disclosure, the term "optical" indicates electromagnetic range at or near optical frequencies; this includes visible light and so-called "near-visible" light such as near infrared, infrared, far infrared and the near and far ultra-violet spectra. The preferred operating range is around 1.5 micron.

Figure 1:
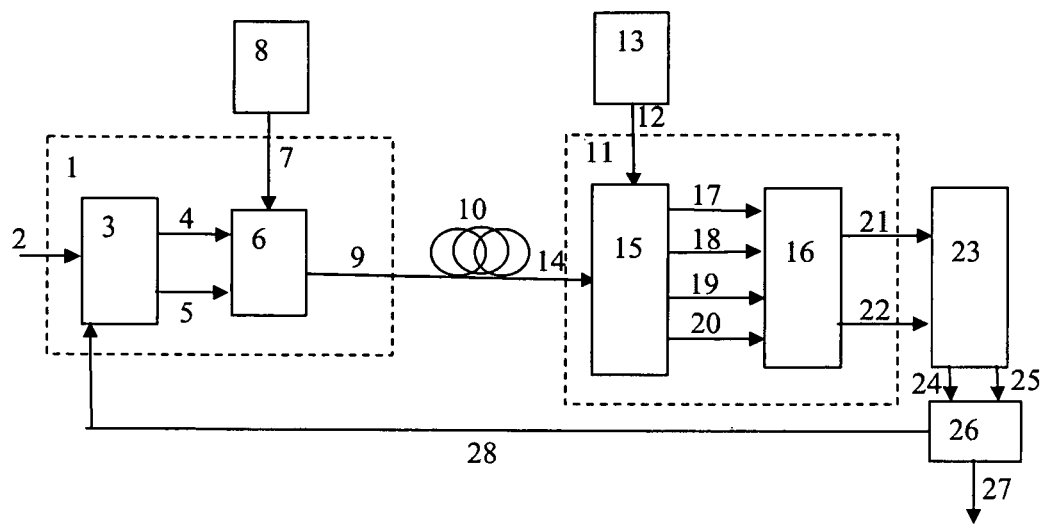
FIG. 1 A block diagram of an OFDM QPSK communications system.

FIG. 1 illustrates a point-to-point OFDM data transmission system using coherent detection. In a transmitter I a digital data stream 2 enters an OFDM encoder 3, which outputs two analog signals 4 and 5 (I and Q) driving an optical modulator 6. The modulator 6 applies the modulation to a light beam 7 emitted by a light source 8. The signal 9 transmitted via an optical link 10 is received by coherent receivers 11. Local oscillator optical signal 12 coming from a light source 13 enters the coherent receiver 11 and interferes with the optical signal 14. The receiver 11 includes an optical hybrid 15, which is a 90-degrees optical hybrid in the preferred embodiment. In another embodiment it is a 120-degrees optical hybrid. Output optical signals 17-20 from the optical hybrid enter a photodetector unit 16 with at least four balanced photodetectors. I and Q electrical outputs 21, 22 from the photodetector unit enter a set of A/D converters 23, followed by a digital signal processing (DSP) unit 26. The output signal 27 can be used for the further processing or display. A control line 28 provides a control signal for the OFDM encoder to adjust the modulation signal to comply with the transmission characteristics. The components of the optical receiver 11 will be described in more details in the following paragraphs.

In another embodiment, the system operates with the light transmission in two polarization states, and the receiver 11 is a polarization diversity receiver (FIG. 2), and it further comprises the following elements. The signal is received by coherent receivers 11H and 11V after splitting by a polarization beam splitter 29 into two beams 30H and 30V with orthogonal polarization. Local oscillator optical signals 12H and 12V having H and V polarization state coming from a local oscillator light source 13 enter the coherent receivers 11H and 11V and interfere with optical signals 30H, 30V having the corresponding H and V polarization states. Each of the receivers 11H and 11V includes an optical hybrid and a set of photodetectors; it will be described in more details in the following paragraphs. Each of the receivers outputs two electrical signals 21H, 22H and 21V, 22V, converted into digital signals in 23, followed by a digital signal processing unit 26. Output signals 27 represent a series of the decoded data streams that can be displayed or transformed into any format for further presentation and use. In the preferred embodiment each of 10 data streams of 27 has a data rate of 10 Gb/s (100 Gb/s total).

Obviously the system can operate in bi-directional configuration with data transmission in both directions. In this case light sources, located at each end of the link, have double functions. Each light source generates the beam for the data transmission by the transmitter 1 and, at the same time, it provides the local oscillator signal for the receiver 11.

Figure 3:
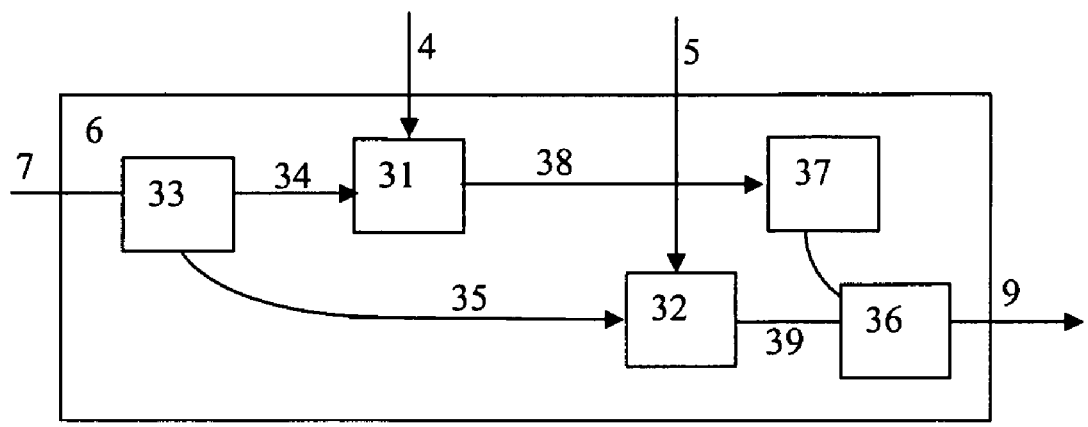
FIG. 3 An optical modulator unit structure.

A variety of the M-PSK data modulation formats can be used in the system and method disclosed in the present invention: QAM, M-QAM, QPSK, BPSK, etc. In one embodiment a quadrature phase shift keying modulation format (QPSK) is implemented. In the preferred embodiment the modulator 6 is a Mach-Zehnder Interferometer (MZI) electro-optic modulator. In the preferred embodiment shown in FIG. 3 QPSK data is embedded in the system using two separate data modulators, which are the parts of the optical modulator 6. One modulator 31 is used for I component and another modulator 32 is for Q component of the data stream. The optical beam 7 is split by the splitter 33 into two beams 34 and 35, modulated and then combined together by the combiner 36 forming the output beam 9. A phase shift of 90-degrees is introduced by a phase shifter 37 in one of the beams 38 or 39. The output beam 9 is transmitted to the receiver via optical link. The optical link can be a fiber link or a free-space link.

In the preferred embodiment the QPSK modulator is an integrated device as disclosed in U.S. patent application Ser. Nos. 11/679,378 and 10/613,772 by the same inventive entity.

Figure 4:
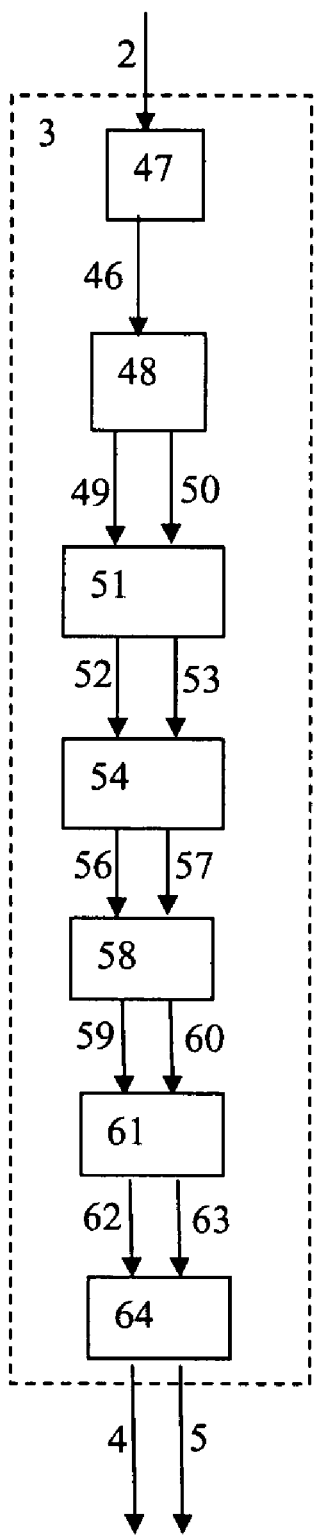
FIG. 4 A data encoding block in OFDM QPSK communications system.

FIG. 4 shows an embodiment of the OFDM encoder 3. This type of encoder was described in details in U.S. patent application Ser. No. 12/045,765 filed Mar. 11, 2008 by the same team of inventors. In the present invention the OFDM encoder further includes a module for the link nonlinearity compensation, which was not previously disclosed.

A serial data stream 2 (FIG. 4) is converted into a parallel sub-carrier data stream 46 in a serial-to-parallel converter 47. In OFDM, the sub-carrier frequencies are chosen so that the sub-carriers are orthogonal to each other, meaning that crosstalk between the sub-channels is eliminated and inter-carrier guard bands are not required. Parallel output data stream 46 enters a QPSK data encoder 48. Two parallel output signals 49 and 50 correspond to I and Q parts of the QPSK signals of each subcarrier. Inverse Fast Fourier Transform is applied in an IFFT unit 51 to the data streams 49 and 50. Then the phase shift is introduced to the signals 52 and 53 in a nonlinearity compensation unit 54. The nonlinearity unit operation will be discussed in more details in the following paragraphs. A cyclic prefix is added to the signals 56, 57 at a prefix unit 58; the cyclic prefix takes a few last symbols of each data block and repeats them at the beginning of the next block. The purpose is to make the scheme resistant to chromatic dispersion. Two sub-carriers may experience differential delay up to the length of prefix, but the orthogonality between the sub-carriers will be preserved and the data will be recovered at the receiver. The data streams 59, 60 are converted in an parallelto-serial converter 61, followed by convertion of 62,63 into analog signals in a D/A converter 64. The analog I and Q signals 4 and 5 are applied to the optical modulator 6 as shown in FIG. 1.

In our system the compensation is achieved within one WDM channel modulated using M-PSK format with OFD multiplexing. Since OFDM signal is resilient to chromatic dispersion we do not have dispersion compensation (or at least we significantly undercompensate it) with this dispersion XPM and FWM between WDM channels is not an issue. Within WDM channel we compensate nonlinear crosstalk between OFDM sub-channels where we measure amplitude instantly even before optical fiber. So no need for long feedback.

It is important to emphasize that pre-compensation for the nonlinear effects works perfectly only in the dispersionless link. In the link with dispersion the instant power varies with distance, and it is practically impossible to predict it at each and every point. It is desirable, therefore, to sample the instant power as often as possible. While instant power inside the link might be inaccessible one can still sample it at two ends and thus provide the improved compensation.

The nonlinearity compensation at the transmitter side in unit 54 is performed by introducing additional phase shift into the signal whose purpose is to compensate for the expected nonlinear shift in the optical link. The compensation is achieved by first estimating the instant input power $P_1(t_i)=Q(t_i)^2+I(t_i)^2$, where a sampling interval $\Delta t_i = t_{i+1} - t_i$ is equal or less than a symbol interval, then calculating expected nonlinear phase shift as $\phi_1(t_i)_i = G_1 P_1(t_i)$ and finally performing an operation $$I(t_i)=I(t_i)\cos(\phi(t_i))-Q(t_i)\sin(\phi(t_i)) \text{ and } Q(t_i)_i=I(t_i)\sin(\phi(t_i)_i)+Q(t_i)_i\cos(\phi(t_i)).$$

Here $G_1$ a is the input parameter that is proportional to the compensating portion of the optical link (in the preferred embodiment it is a half-length L/2) and the fiber nonlinearity parameter gamma $\gamma$ (in units of 1/(W*km)

$G_1=M\gamma E(L/2)$, where E is an average laser power, M is the coefficient (in unit of W) indicating the launch power in the optical fiber at the front end per voltage level corresponding to one digitization bit in our system. In includes the laser power, insertion loss of the multiplexer, MZI modulator transfer parameters and all other system components characteristics.

Figure 2:
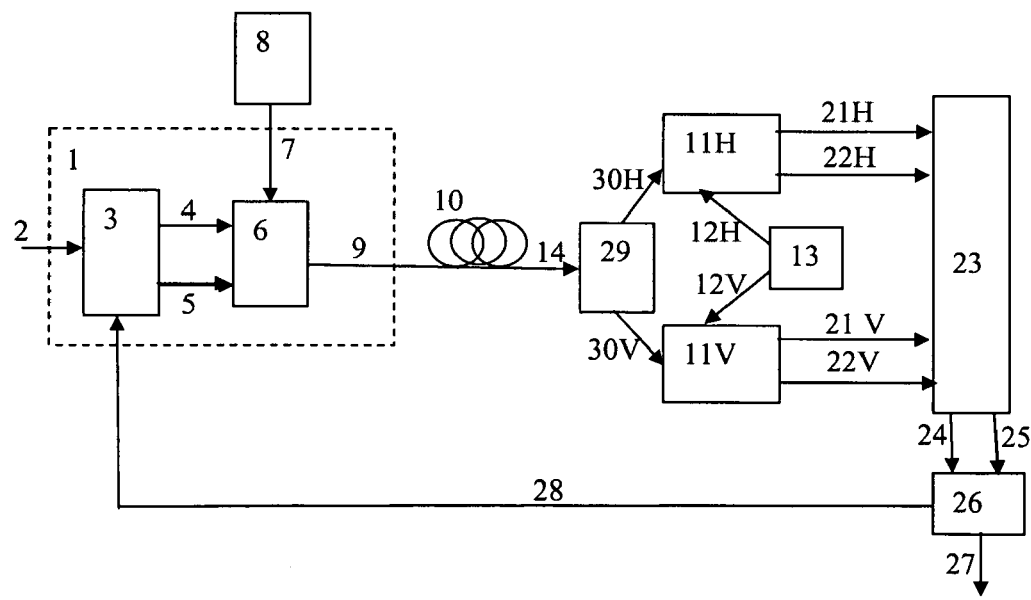
FIG. 2 A block diagram of an OFDM QPSK communications system operating in two polarizations.

In another embodiment an adjustment of the parameter $G_1$ is performed periodically to follow slow changes of the optical link properties. The parameter is adjust by using a feedback 28 from the receiver side as shown in FIGS. 1 and 2. The adjustment occurs on a very long time scale (seconds).

Figure 5:
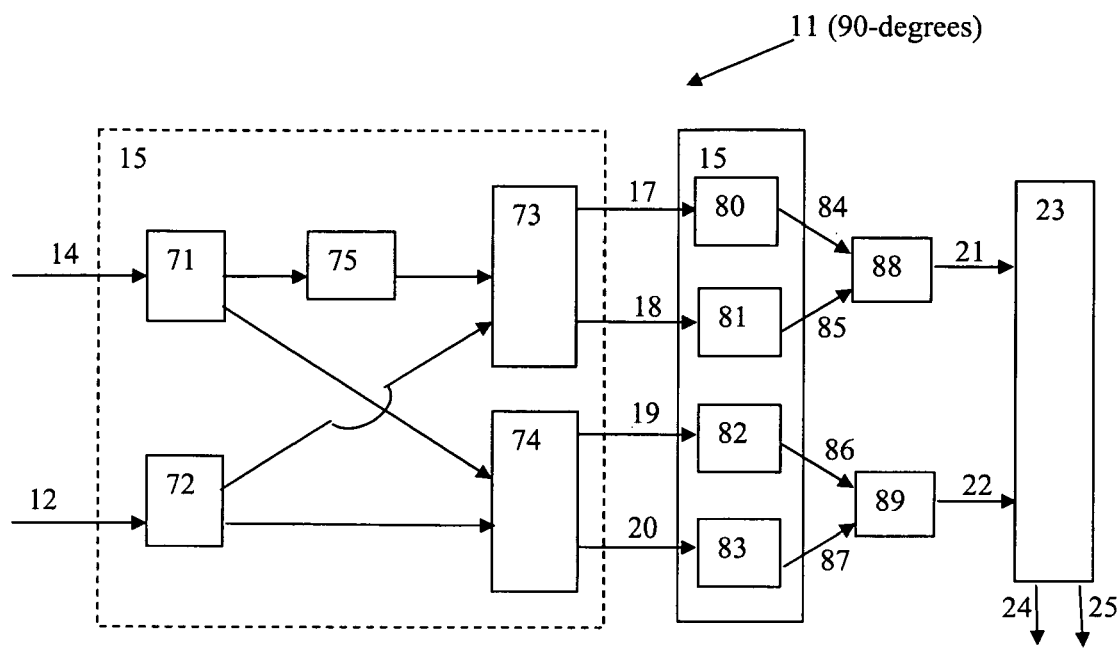
FIG. 5 A coherent optical receiver for OFDM communications system: (a) with 90-degrees optical hybrid, (b) with 120-degrees optical hybrid.
Figure 5:
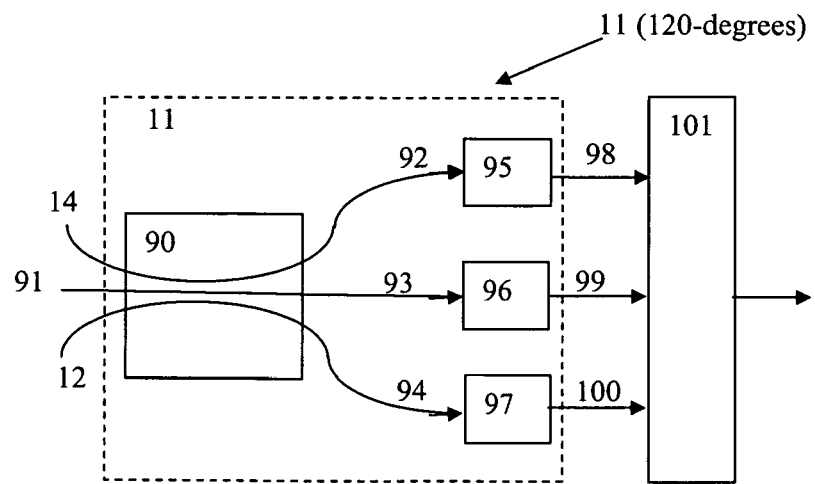

FIG. 5 illustrates two embodiments of the coherent receiver 11 to be used to recover QPSK data: (a) with 90-degrees optical hybrid, (b) with 120 degrees optical hybrid. The incoming signal 14 enters an optical hybrid 15, which is a 90-degrees optical hybrid in the preferred embodiment. The 90-degrees hybrid has four couplers 71, 72, 73, 74 and a phase shifter 75. The structure of the 90-degrees optical hybrid 15 is disclosed in detail in co-pending U.S. patent application Ser. No. 11/695,920 and parent patents for that application, incorporated herein by reference. The incoming signal 14 is mixed with the local oscillator optical signal 12 producing four output optical signals 17-20. A set of four balanced photodetectors 80-83 is used to convert the signals 17-20 into electrical domain. I and Q electrical outputs 21 and 22 are digitized in the A/D converter 23.

In another embodiment the optical hybrid is a 120-degrees optical hybrid shown in FIG. 5 (b). The structure and performance of the 120-degrees optical hybrid is disclosed in details in U.S. Pat. No. 4,732,447 by Wright and in U.S. Pat. No. 7,085,501 by Rickard. 120-degrees optical hybrid 90 has three inputs 24, 91, 21 and three outputs 92, 93, 94. The output signals 92-94 pass through three detector diodes 95, 96, and 97 as illustrated. In the signal processing unit 34 the electrical signals 98,99, and 100 are split into two signal paths each. Each of these six signals is mixed with a signal from a local oscillator so as to create phase differences between said six signal paths. These six signals are combined in two groups of three so as to create an in phase and a quadrature channels in a 120-degrees hybrid processing unit 101. The transmitted data is recovered from the in-phase and quadrature signals.

The above description of the 120-degrees optical hybrid is presented as an illustration of its possible structure and performance. Obviously various modifications can be made by a person skilled in the art. The present invention is not limited to one particular example, but comprises a variety of possible embodiments.

Figure 6:
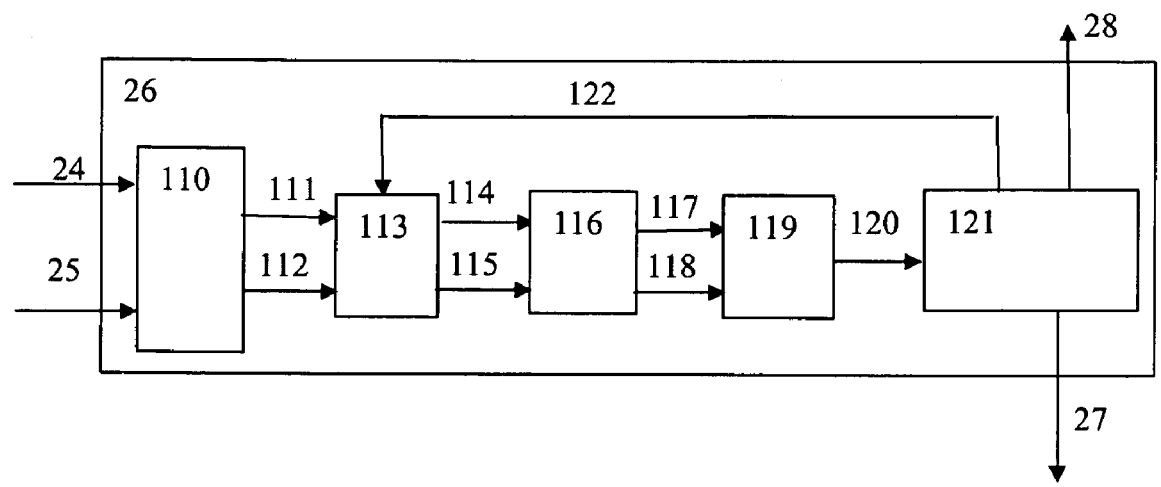
FIG. 6. An adaptive feedback link in OFDM communications system.

The DSP unit 26 is shown in more detail in FIG. 6. I and Q serial digital signals 24 and 25 are parallelized in a serial-to-parallel converter 110. The obtained signals 11 and 112 are used as an input to the FFT block 113 which generates the parallel data symbol streams 114 and 115, comprising the signals of each of the sub-carriers. The FFT block is followed by a receiver nonlinearity compensation unit 116, generating streams 117 and 118, which enter a parallel-to-serial unit 119 for grooming the parallel data back to serial or perhaps as a set of serial signals of a lower rate (a parallel-to-serial converter and data demultiplexer). Parameters of the output signal 120 are measured periodically at an evaluation unit 121, which provides a first control signal 28 to the transmitter and a second control signal 122 to the receiver non-linearity compensation unit 16. The output signal 27 is presented as a parallel set of 10 Gbps serial signals. The operation of OFDM signal recovery is disclosed in more details in co-pending U.S. patent application Ser. No. 12/045,765 by the same team of inventors.

The nonlinearity compensation at the transmitter side in unit 116 is performed by introducing additional phase shift into the signal whose purpose is to compensate for the expected nonlinear shift in the optical link. It is carried out similarly to the nonlinear compensation at the receiver. $G_2$ is the input parameter for the compensating portion of the optical link, which is in the preferred embodiment the second half of the optical link, and in general case it differs from the parameter $G_1$ for the first half of the link.

The system performance is measured in 121. In one embodiment it measures the signal BER, in another embodiment—eye diagram opening, and there is variety of parameters that may be used to characterize the system performance. Since the power levels may differ in different WDM channels, it is desirable to use performance in each channel to close the loop by adaptively adjusting $G_1$ and $G_2$ parameters in slow regime (seconds) following the link changes due to the environment or other reasons.

The main advantage of the proposed system for the long haul communications consist of its resiliency in the presence of chromatic dispersion. With each sub-channel essentially occupying only a narrow frequency band in the vicinity of $f_c+f_m$ ($f_c$ is an optical carrier) the effect of chromatic dispersion is mitigated. Furthermore, with integration period of T one can add a guard-band equal to a certain fraction of $\alpha T$ of T (for example $\alpha=0.1$) which will allow one to tolerate much larger group delay. In essence the OFDM system with M sub-carriers operating at symbol rate B can tolerate the chromatic dispersion as a conventional system with symbol rate $B/\alpha M$.

Figure 7:
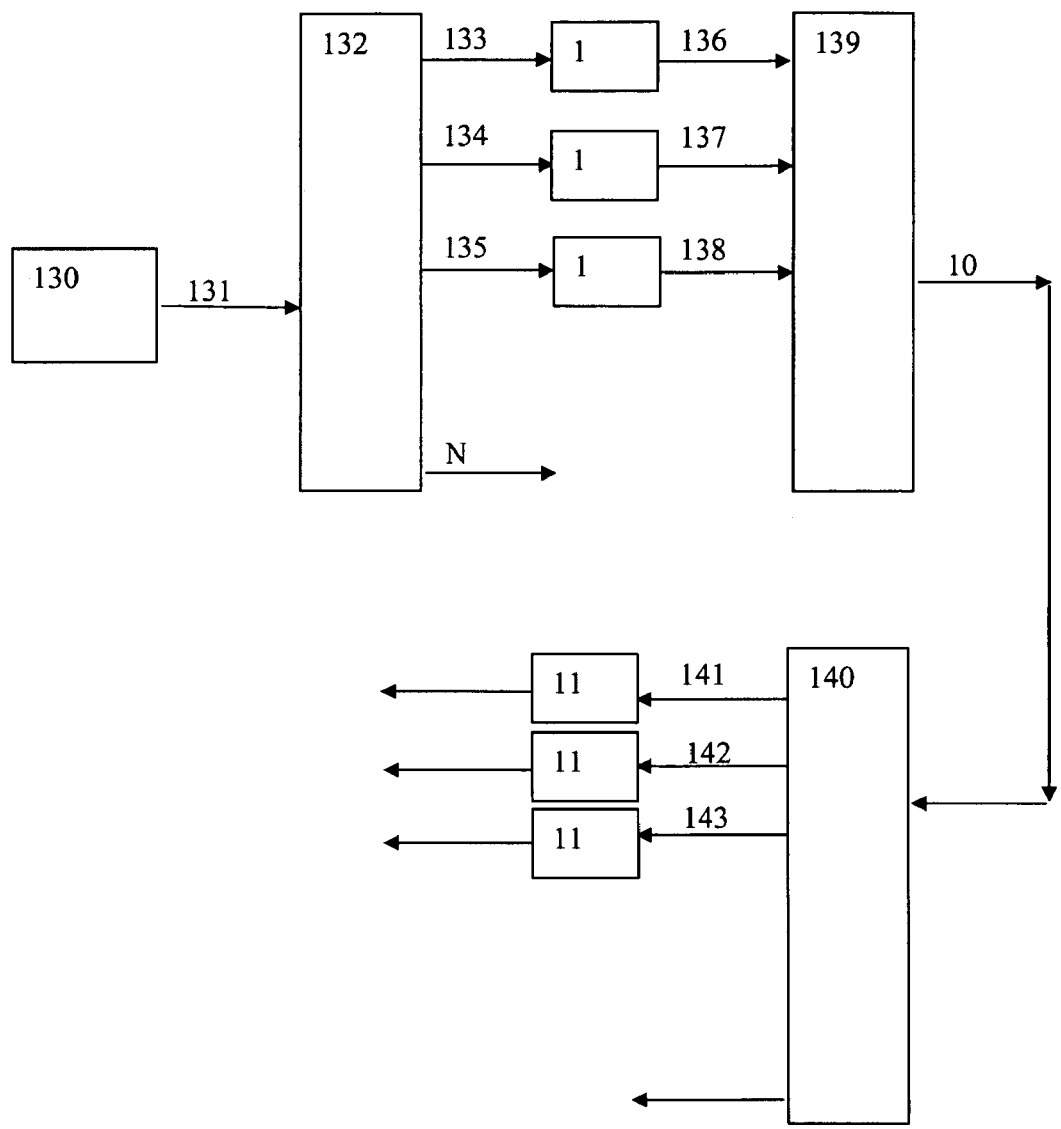
FIG. 7 A block diagram of an WDM OFDM QPSK communications system.

An embodiment of WDM transmission link which employs OFDM is shown in FIG. 7. A light source 130 generates radiation 131 having multiple wavelengths. In the preferred embodiment the light source 130 an optical comb generator as disclosed in U.S. Pat. No. 7,123,800 by the same inventive entity, incorporated herein by reference. A wavelength demultiplexer 132 separates each tooth of the spectral comb. Optical beams 133-135 . . . N form a series of optical channels. Each channel is modulated by QPSK signal using OFDM system as shown in FIG. 1. A multiplexer 139 combines all channels for the transmission via the optical link 10. At the receiving end each channel is separated by a demultiplexer 140 and processed as shown in FIG. 1.

The foregoing description of a preferred embodiment of the invention has been presented for purposes of illustration and description. It is not intended to be exhaustive or to limit the invention to the precise form disclosed, and obviously many modifications and variations are possible in the light of the above teaching. The described embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An optical receiver to receive a data modulated beam from an optical link, comprising:
at least a first optical hybrid for receiving the data modulated beam and a local oscillator beam; the data modulated beam being one channel of WDM orthogonal frequency division multiplexed (OFDM) communication system, the OFD multiplexing having N subcarrier in each WDM channel, each subcarrier being individually M-PSK encoded,
a set of photodetectors receiving output beams from the optical hybrid and producing electrical signals I and Q;
a digital signal processing unit receiving the electrical signals I and Q, converting them into digital signals, measuring their instant power $P_1(t_i)=Q(t_i)^2+I(t_i)^2$, where a sampling interval $\Delta t_i = t_{i+1} - t_i$ is equal or less than a symbol interval,
calculating an expected nonlinear phase shift $\phi_1(t_i)_i$ for the i-th sampling interval,
performing a nonlinearity compensation by multiplying the signals $I(t_i)$ and $Q(t_i)$ on a nonlinearity coefficient depending on the expected nonlinear phase shift,
transforming the digital signals into frequency domain, forming a set of spectral signals each having its own digital frequency, demodulating the data encoded in each spectral signal, and outputting a received information.

2. The receiver of claim 1, wherein the expected nonlinear phase shift is $\phi_1(t_i)_i = G_1 P_1(t_i)$ and $G_1$ is a parameter being proportional to a link nonlinearity $\gamma$, $G_1 = M \gamma E L_1$, wherein $L_1$ is a length of a compensating part of the optical link, E is an average optical beam power and M is a power coefficient in unit of Watt indicating the launch power in the optical link at the front end per voltage level corresponding to one digitization bit.

3. The receiver of claim 2, wherein $L_1$ is a second half-length of the optical link.

4. The receiver of claim 2, wherein the nonlinearity compensation is performed by the following multiplication $I(t_i)=I(t_i)\cos(\phi(t_i))-Q(t_i)\sin(\phi(t_i))$ and $Q(t_i)_i=I(t_i)\sin(\phi(t_i)_i)+Q(t_i)_i\cos(\phi(t_i))$.

5. The receiver of claim 2, wherein the parameter $G_1$ is additionally adjusted following slow changes in the optical link properties.

6. The receiver of claim 1, wherein the first optical hybrid is a 90-degrees optical hybrid.

7. The receiver of claim 1, wherein the optical receiver is adapted for operation with the optical signal of two polarization states.

8. An optical transmitter to transmit a data encoded beam over an optical link, comprising:
a digital data stream entering an orthogonal frequency division multiplexed (OFDM) encoder, the encoder outputting I and Q analog signals driving an optical modulator, the modulator modulating separately each OFDM subcarrier of each WDM channel of an initial optical beam from a light source, the modulator outputting a M-PSK modulated optical beam to be transmitted in the optical link, wherein the OFDM encoder performs a compensation of the optical link nonlinearity by multiplying each subcarrier on a compensation coefficient.

9. The transmitter of claim 8, wherein the compensation is performed by estimating instant power $P_2(t_i) = Q(t_i)^2 + I(t_i)^2$, where a sampling interval $\Delta t_i = t_{i+1} - t_i$ is equal or less than a symbol interval, calculating an expected nonlinear phase shift $\phi_2(t_i)_i$ for the i-th sampling interval, performing a nonlinearity compensation by multiplying each subcarrier on a nonlinearity coefficient depending on the expected nonlinear phase shift.

10. The transmitter of claim 9, wherein the expected nonlinear phase shift is $\phi_2(t_i)_i = G_2 P_2(t_i)$ and $G_2$ is a parameter being proportional to a link nonlinearity $\gamma$, $G_2 = M \gamma E L_2$, wherein $L_2$ is a length of a compensating part of the optical link, E is an average optical beam power and M is a power coefficient in unit of Watt indicating the launch power in the optical link at the front end per voltage level corresponding to one digitization bit.

11. The receiver of claim 10, wherein the nonlinearity compensation is performed by the following multiplication $I(t_i)=I(t_i)\cos(\phi(t_i))-Q(t_i)\sin(\phi(t_i))$ and $Q(t_i)_i=I(t_i)\sin(\phi(t_i)_i)+Q(t_i)_i\cos(\phi(t_i))$.

12. The transmitter of claim 11, wherein $L_2$ is a first half-length of the optical link.

13. A system for a data transmission via an optical communication link, comprising:
a digital data stream entering an orthogonal frequency division multiplexed (OFDM) encoder, the encoder outputting I and Q analog signals driving an optical modulator, the modulator modulating separately each OFDM subcarrier of each WDM channel of an initial optical beam from a light source, the modulator outputting a M-PSK modulated optical beam to be transmitted in the optical link,
wherein the OFDM encoder performs a compensation of the optical link nonlinearity by multiplying each subcarrier on a compensation coefficient;
the modulated beam being received by an optical receiver, comprising:
at least a first optical hybrid for receiving the data modulated beam and a local oscillator beam;

a set of photodetectors receiving output beams from the optical hybrid and producing electrical signals I and Q;

a digital signal processing unit receiving the electrical signals I and Q, converting them into digital signals, measuring their instant power $P_1(t_i)=Q(t_i)^2+I(t_i)^2$, where a sampling interval $\Delta t_i=t_{i+1}-t_i$ is equal or less than a symbol interval, calculating an expected nonlinear phase shift $\phi_1(t_i)_i$ for the i-th sampling interval, performing a nonlinearity compensation by multiplying the signals $I(t_i)$ and $Q(t_i)$ on a nonlinearity coefficient depending on the expected nonlinear phase shift, transforming the digital signals into frequency domain, forming a set of spectral signals each having its own digital frequency, demodulating the data encoded in each spectral signal, and outputting a received information.

14. The system of claim 13, wherein the OFDM encoder compensates nonlinearity of a first half of the optical link, and the digital signal processing unit compensates nonlinearity of a second half of the optical link.

15. The system of claim 13, wherein the transmission is in fiber.

16. The system of claim 13, wherein the expected nonlinear phase shift is $\phi_1(t_i)_i=G_1 P_1(t_i)$ and $G_1$ is a parameter being proportional to a link nonlinearity $\gamma$, $G_1=M \gamma E L_1$, wherein $L_1$ is a length of a compensating part of the optical link, E is an average optical beam power and M is a power coefficient in unit of Watt indicating the launch power in the optical link at the front end per voltage level corresponding to one digitization bit; and wherein the nonlinearity compensation in the OFDM encoder is performed by the following multiplication $I(t_i)=I(t_i)\cos(\phi(t_i))-Q(t_i)\sin(\phi(t_i))$ and $Q(t_i)_i=I(t_i)\sin(\phi(t_i)_i)+Q(t_i)_i\cos(\phi(t_i))$.

17. The system of claim 16, wherein the compensation in the receiver is performed by estimating instant power $P_2(t_i)=Q(t_i)^2+I(t_i)^2$, calculating an expected nonlinear phase shift $\phi_2(t_i)_i$ for the i-th sampling interval, the expected nonlinear phase shift is $\phi_2(t_i)_i=G_2 P_2(t_i)$ and $G_2$ is a parameter being proportional to a link nonlinearity $\gamma$, $G_2=M \gamma E L_2$, wherein $L_2$ is a length of a compensating part of the optical link, and the nonlinearity compensation is performed by the following multiplication $I(t_i)=I(t_i)\cos(\phi(t_i))-Q(t_i)\sin(\phi(t_i))$ and $Q(t_i)_i=I(t_i)\sin(\phi(t_i)_i)+Q(t_i)_i\cos(\phi(t_i))$.

18. The system of claim 13 adapted to operate with data transmission using an optical beam having two polarization states.

19. The system of claim 13, wherein a data transmission rate is 100 Gb/s.

20. The system of claim 13, wherein the M-PSK format is selected from QPSK or QAM or M-QAM.

* * * * *